United States Patent [19]

Lubitz et al.

[11] Patent Number: 5,425,889
[45] Date of Patent: Jun. 20, 1995

[54] METHOD FOR PRODUCING A PIEZOCERAMIC

[75] Inventors: Karl Lubitz, Ottobrunn; Gabriele Preu, Munich; Dieter Cramer, Holzkirchen, all of Germany

[73] Assignee: Siemens Aktiengesellschaft, Munich, Germany

[21] Appl. No.: 238,759

[22] Filed: May 5, 1994

[30] Foreign Application Priority Data

May 5, 1993 [DE] Germany .................. 43 14 911.1

[51] Int. Cl.⁶ .................. C04B 35/491; H01B 1/08
[52] U.S. Cl. ........................ 252/62.9; 501/134
[58] Field of Search .................. 252/62.9; 501/134

[56] References Cited

U.S. PATENT DOCUMENTS 4,990,324 2/1991 Tomita et al. .................. 252/62.9

FOREIGN PATENT DOCUMENTS 2330057 1/1994 Germany .

OTHER PUBLICATIONS

"Optimum Preparation Methods for Piezoelectric Ceramics and Their Evaluation", Yamamoto, Ceramic Bulletin, vol. 71, No. 6, 1992 (pp. 978-985). no month.

Primary Examiner—Mark L. Bell
Assistant Examiner—C. M. Bonner
Attorney, Agent, or Firm—Hill, Steadman & Simpson

[57] ABSTRACT

In a method for producing a PZT piezoceramic, an intermediate compound is formed having the formula $Zr_xTi_{1-x}(O_2(ZTO)$ in a hydrothermal process. A ceramic having a desired zirconium/titanium ratio can be produced from two such ZTO powders having respectively different x-values. These powders are blended with lead oxide, and if desired with dopants, and are converted into a PZT powder by calcining. The calcined PZT powder is then sintered to form a high-density PZT ceramic which can be aligned precisely at the morphotropic phase boundary.

4 Claims, No Drawings

METHOD FOR PRODUCING A PIEZOCERAMIC

BACKGROUND OF THE INVENTION

1. Field Of the Invention

The present invention is directed to a method for producing a piezoceramic, and in particular to a method for producing a piezoceramic employing doped lead zirconium titanate (PZT) having a titanium/zirconium ratio which is precisely matched with respect to the morphotropic phase boundary.

2. Description of the Prior Art

It is known that optimum material properties are obtained in the production of a piezoceramic on the basis of doped lead zirconium titanate (PZT) when the titanium/zirconium ratio is exactly matched at least in the range of a few thousandths, with respect to the morphotropic phase boundary, when the titanium and zirconium atoms in the ceramic are uniformly distributed over the grains as well as in the individual grains, and when the sintering temperature for the piezoceramic is as low as possible. The latter condition achieves stable and reproducible conditions by minimizing the evaporation of the lead oxide content from the ceramic during the sintering.

These demands can only be met when extremely fine, chemically uniform and pure-phase PZT powders having a suitable stoichiometry are used for shaping the grain compacts, which can subsequently be sintered at low temperature.

Numerous methods are known for producing PZT powders having the required properties. For example, powders can be produced chemically by co-precipitation, spraying reaction or sol-gel processes. These powders already containing all cations including lead. An optimally low sintering temperature is usually achieved by controlling the fineness of the particles.

Known chemical processes, however, have several disadvantages. These disadvantages include the high manufacturing costs of the powders, the usually small batch sizes, and the fluctuation of the composition from batch-to-batch, a distribution of titanium and zirconium in the powder which is still non-uniform and, most importantly an insufficient reproducibility of the optimum composition of the piezoceramic with respect to the morphotropic phase boundary.

For these reasons, an optimized mixed oxide method is therefore often used for practical a piezoceramic in commercial quantities. In this method, a mixture of lead oxide (PbO) dopant oxides, titanium dioxide ($TiO_2$) and especially finely particulate zirconium oxide ($ZrO_2$) is ground, dried and, typically, convened (calcined) into PZT powder at approximately 900° C. Due to the different reaction behavior of $TiO_2$ and $ZrO_2$ with PbO, however, PZT powder particles arise having a Ti/Zr ratio from $PbTiO_3$ through $PbZrO_3$ which is significantly scattered around a desired value. The powder must therefore be ground and mixed a second time. The homogeneity of the titanium/zirconium ratio which can be achieved by diffusion and grain growth in the sintering of this known powder during compression is limited by the sintering temperature, by the particle size, as well as by the inhomogeneity of the powder. The optimum piezoelectric material values of the sintered ceramic, or the optimum composition of the sintered ceramic with respect to the morphotropic phase boundary, are empirically set for each process on site, and may be possibly re-adjusted by a fine variation of the oxide mixture with respect to the Ti/Zr ratio. A reproducible, although frequently complicated, production of PZT piezoceramics is thus possible by means of these measures.

A combination of the known mixed oxide method and the known chemical processes for producing a PZT ceramic is described in Ceramic Bulletin, Vol. 71, No. 6, (1992), page 978. In this article, the author proposes that $ZrTiO_2$ (ZTO) having a variable Ti/Zr ratio be produced as a uniform predecessor compound employing a technique known as the hydrothermal method in a two-stage process. The resulting predecessor compound is then calcined and only thereafter is the calcined compound ground with PbO and mixed therewith. In a further calcining step, the lead oxide reacts very easily with the ZTO and forms a pure-phase PZT powder having a uniform Ti/Zr ratio.

A disadvantageous of this method, however, is that the precipitation of the corresponding oxides, which is accomplished chemically, leads to deviations, albeit slight deviations, in the Ti/Zr ratios from batch to batch. Because the composition is usually selected in the proximity of the morphotropic phase boundary, this can result in a large variation in the properties of the piezoceramic thus obtained.

SUMMARY OF THE INVENTION

It is an object of the present invention to provide a method for the production of a PZT ceramic which is simple to implement and which results in a uniform ceramic having optimized properties in a reproducible manner.

The above object is achieved in accordance with the principles of the present invention in a method for producing a PZT ceramic having the formula $Pb(Zr_xTi_{1-x})O_3$, wherein $zero<x<1$, wherein a first intermediate compound having the formula $Zr_yTi_{1-y}(O_2)$ is produced by a hydrothermal process, with $(x+1\%) \leq y \leq (x+3\%)$, and wherein a second intermediate compound having the formula $Zr_zTi_{1-z}O_2$ is also produced by a hydrothermal process, with $(x-3\%) \leq z \leq (x-1\%)$. The first and second intermediate compounds are then ground with lead oxide (PbO) in a ratio a:b:1, wherein $a+b=1$ and $x=a \cdot y + b \cdot z$. The ground mixture is then calcined to form a PZT powder. Shaped members of the PZT powder are then produced, and the shaped members are sintered to form a PZT ceramic.

The method of the invention preserves all of the advantages which are obtained when two ZTO compositions (intermediate compounds) are employed instead of a single ZTO composition. Such a single ZTO composition may have an x-value (for the zirconium part) which is between 1% and 3% above or below the desired and presumably optimum composition value $X_{opt}$, at which optimum piezoelectrical material values and an optimum characteristic with respect to the morphotropic phase boundary are anticipated. The unavoidable fluctuations from batch-to-batch, or deviations from the nominal composition in the hydrothermal synthesis, can then easily be taken into consideration in the present method on the basis of pre-trials and an empirical series of available mixtures of the two ZTO powders. As a result of the intentional, slight deviation from the optimum composition in the employment of two intermediate compounds having respectively differently compositions, a reproducible ceramic production with optimum material values is achieved in a simple way.

It is surprising that a highly uniform PZT ceramic, without foreign phases, nonetheless arises despite the intentionally produced inhomogeneity of the intermediate compounds. Different ceramics having differently optimized material properties can thus be produced with the same initial products, i.e., the same intermediate compounds.

A piezo-element produced from a piezoceramic made by the inventive method exhibits improved data compared to a known, standard piezoceramic (standard Vibrit 420 ®). For example, a piezo-element produced in accordance with the invention has a relative permittivity of 1823 and a coupling factor kp of 0.62, with more than a halved temperature coefficient of the capacitance TkC of 1645. Such a combination of values is of interest, for example, for sensors.

The electrical properties of individual compositions correspond to the best values obtainable for a given composition, so that an employment of the piezo-element produced in accordance with the invention for medical ultrasound transducers, having high sound density and sensitivity, is possible. Another composition can be employed to result in a piezo-element in accordance with the method which can be used as a sensor having a high sensitivity and a low temperature response.

Another possible use of piezoceramic produced in accordance with the method is in the field of multi-layer members. Films drawn from PZT ceramic material made in accordance with the invention having a layer thickness of 40 through 70 $\mu$m are capable of being sintered at 1130° C. to form a transparent ceramic having a density of nearly 100%. Given further improvement of the method, even significantly lower sintering temperatures of below 1100° C. are anticipated for the foil-drawing technique. This makes the employment of economic AgPd electrodes possible.

For a PZT ceramic doped with a few mol percent of Nb or Nd, the morphotropic phase boundary given an x-value for the zirconium part is anticipated between 0.53 and 0.56. Because the composition of such a usable piezoceramic lies on or in the proximity of the morphotropic phase boundary, the x-value in the method of the invention is selected between 0.5 and 0.6, and preferably between 0.53 and 0.56. Given higher doping, or in other applications, the x-value may lie in the larger range of $0 < x < 1$.

In a further embodiment of the invention, the aforementioned intermediate compounds are precipitated together with desired dopants in the hydrothermal process. This has the advantage of achieving a highly uniform distribution of the dopants as well.

It is also possible to add the dopants at the time of grinding the first and second intermediate compounds, in the form of oxides of the dopants, and to grind them together with the intermediate compounds and the lead oxide PbO.

Calcining of the powder mixtures to form PZT powder preferably ensues at 700° through 850° C., with a single-phase and uniform PZT material already being obtained at 700° C. The grain size of the PZT powders obtained during calcining also increases with increasing temperature, which in turn require a higher sintering temperature. This temperature usually lies between 1050° and 1250° C. A high-density PZT ceramic having a density of more than 95% of the theoretical density is obtained.

The uniform blending of the first and second intermediate compounds, the lead oxide, and dopants (if present) usually ensues according to standard methods by means of a wet grinding.

The PZT powder obtained as a result of calcining can be utilized for forming compacted shapes without after-grinding in order, for example, to form blocks and tablets by pressing. A slurry or slip may alternatively be produced using a binding agent which, for example, can be cast or drawn into a film.

DESCRIPTION OF THE PREFERRED EMBODIMENTS

The method of the invention shall be described in greater detail below with reference to exemplary embodiments.

The intermediate compounds having the above-identified formulae are produced in the standard manner according to the hydrothermal process. Aqueous solutions of inorganic salts, gels or oxides are employed. These solutions are pressurized at a pressure of up to 15 MPa, at which point the solution is exposed to a temperature between the boiling point of water (at the given pressure) and the critical temperature (374° C.). A uniform precipitation of the oxides is thereby effected. The desired mixed crystal arises directly; a calcination outside the reactor employed for the manufacture is not necessary. The precipitate of the intermediate compound (ZTO) is separated and dried. Extremely fine powders having grain diameters of, typically, 200 nanometers and having a tight distribution of grain sizes in the overall powder are obtained, as well as having a titanium/zirconium ratio which is uniform over all of the powder particles. The method can be quasi-continuously implemented, with large batches up to a few hundred kilograms being economically manufactured with uniform composition. Desired dopants can also be co-precipitated and can likewise be uniformly bonded into the ZTO powders.

The ZTO powder is then blended with the required quantity of lead oxide, this quantity being selected slightly above the stoichiometrically required amount in order to compensate for losses (evaporation) of the volatile lead oxide during sintering. With the addition of water, the powders are ground in a ball mill under standard conditions for 18 hours, and are then filtered and dried.

A heating rate of between 1 and 10 Kelvins per minute, for example, 2 K./min., is set for calcining, the desired calcination temperature between 700° and 850° C. being held for approximately 2 hours. Cooling is then slowly undertaken. After the calcination, the powders are merely pestled and sieved and can be immediately further-processed. X-ray diffractometer investigations of the powders obtained show that pure-phase PZT arises during the calcination, and that no foreign phases whatsoever are present. The reaction of the lead oxide with the ZTO powder already ends at 700° C. The powders exhibit a specific surface of approximately 3.7 $m^2/gr$ and an average grain size of less than 4 $\mu$m.

The sieved powder is granulated and pressed to form shaped members, whereby grain densities of up to 60% of the theoretical density are already achieved.

For sintering, the shaped members are heated to a sintering temperature between 1050° and 1250° C. with a heating rate of I through 10 K./min., and are held for approximately 0.5 through 2 hours at this temperature, and are subsequently cooled. Densities of up to 97% of the theoretical density are achieved, which represent typical, upper limit values for air-sintered PZT ceramic. The grain size identified by thermal etching is in the range between 1 and 8 μm, and is dependent on the calcination and on the sintering temperature.

Corresponding to the above-described method, a PZT ceramic having the general formula $Pb(Zr_xTi_{1-x})O_3$ is to be produced, whereby the zirconium/titanium ratio should be selected so that it lies at an optimum the value, i.e., a value such that the properties of the ceramic produced in this manner are optimum.

An x-value of 0.54 is assumed to be needed for a composition lying on the morphological phase boundary. In order to achieve such a composition, a first intermediate compound $Zr_yTi_{1-y}(O_2)$ with y=0.56 and a second intermediate compound $Zr_zTi_{1-z}(O_2)$ with z=0.52 are produced according to the hydrothermal method set forth in detail above.

By weighing the corresponding proportions of the first and second intermediate compounds according to the formula $x = a \cdot y + b \cdot z$, with $a + b = 1$, with corresponding amounts of lead oxide PbO and doping oxide, powder mixtures are produced having gross compositions wherein the x-value is varied in 0.5% steps between the two extremes of 0.52 and 0.56. These mixtures are ground and calcined as set forth above. The PZT powders of different compositions obtained in this manner are pressed into shaped members as described above, and are then sintered to form test members.

SEM images show a uniform ceramic structure of the test members, indicating a uniform structure and a composition which is uniform over the crystal grains with respect to the zirconium/titanium ratio.

For investigating the properties of the test members, the test members are abraded or ground, metallized and polarized at 150° C. The relative permattivity $\epsilon$, the coupling factor kp, the loss angle tan δ, the qualify factor Q, the piezoelectric charge constant $d_{33}$ (with both large-signal and small-signal measurement), as well as the temperature coefficient of the capacitance TkC were measured.

The evaluation of the measured values shows that the composition of the test members having the optimum properties deviates from the initially assumed composition having an x-value of 0.54. Special value combinations are observed, for example, test members having x=0.550 and x=0.555. The former test member exhibits better piezo data ($\epsilon$=1823, kp=0.62) with more than a halved TkC value of 1645 in comparison to a standard piezoceramic (Vibrit 420 ®) which exhibits $\epsilon$=1600, kp=0.60 and TkC=3500. This indicates a sharper transition at the morphotropic phase boundary as a consequence of a more uniform zirconium/titanium distribution. These results are comparable to ceramic members or piezoceramics that are obtained according to known processes with sol-gel powders and, as in those known products, are attributed to the micro-uniformity of the powders. Compared to the sol-gel powders, however, an enormous cost advantage, as well as an especially simple manufacturing technique, for PZT ceramics having optimum composition is achieved in accordance with the method of the invention.

The electrical properties of other compositions and sintering processes, particularly of the test member having the x-value of 0.555, substantially correspond to those of further standard ceramics such as Vibrit 525 ®, which permits the expectation of suitability for employment in a medical ultrasound transducer having a high sound density and sensitivity. The properties of the test member having x=0.550 suggest that this composition is suitable for employment as a sensor with high sensitivity and low temperature response.

As noted above, a possible further application of the piezoceramics manufactured in accordance with the method of the invention is in the field of multi-layer elements.

The method of the invention has the advantage that a ceramic which is highly uniform in terms of its zirconium/titanium ratio is obtained without the employment of expensive powders to achieve such a result such as, for example, sol-gel powders or co-precipitate powders. A further advantage is the flexibility of the method. Any type of ceramic powder based on ZTO compositions can be produced by mixing and doping. Using only two respectively different intermediate compounds having different zirconium/titanium compositions, it is possible to manufacture PZT ceramics having different zirconium/titanium ratios and to precisely prepare these compositions with respect to the morphotropic phase boundary according to empirically identified, optimum mixing ratios of the two ZTO intermediate compounds. Because, for example, additionally added neodymium oxide and/or nickel oxide and/or niobium oxide can be uniformly built into the mixed crystal, any desired doping of PZT ceramics, up to a maximum of about 50%, can be achieved in accordance with the method of the invention. Such highly doped nickel/niobium dopings are required for high-efficiency ceramics.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for producing a PZT ceramic having the formula $Pb(Zr_xTi_{1-x})(O_3)$, wherein $0 < x < 1$, comprising the steps of:
    (a) hydrothermally producing a first intermediate compound having the formula $Zr_yTi_{1-y}(O_2)$ with $(x+1\%) \leq y \leq (x+3\%)$;
    (b) hydrothermally producing a second intermediate compound having the formula $Zr_zTi_{1-z}(O_2)$ with $(x-3\%) \leq z \leq (x-1\%)$;
    (c) grinding said first and second intermediate compounds with lead oxide PbO in a ratio a:b:1, wherein $a+b=1$ and $x = a \cdot y + b \cdot z$, to obtain a mixture;
    (d) calcining the mixture obtained in step (c) in a temperature range of 700° through 850° C. and thereby convening said mixture to form a PZT powder;
    (e) producing shaped members of said PZT powder; and
    (f) sintering said shaped members in a temperature range of 1050° through 1250° to form a PZT ceramic.

2. A method as claimed in claim 1 wherein said first and second intermediate compounds are precipitated together with dopants in the respective hydrothermal process in steps (a) and (b).

3. A method as claimed in claim 1 wherein step (c) is further defined by grinding dopant oxides for piezoceramics together with said first and second intermediate compounds.

4. A method as claimed in claim 1 wherein step (c) is further defined by conducting said grinding as wet grinding.

* * * * *